United States Patent
Hong

(10) Patent No.: US 9,059,625 B2
(45) Date of Patent: Jun. 16, 2015

(54) LINEAR VIBRATION DEVICE HAVING SPRING

(75) Inventor: Jung Taek Hong, Gyunggi-do (KR)

(73) Assignee: Samsung Electro-Mechanics Co., Ltd., Gyunggi-Do (KR)

(*) Notice: Subject to any disclaimer, the term of this patent is extended or adjusted under 35 U.S.C. 154(b) by 182 days.

(21) Appl. No.: 13/565,351

(22) Filed: Aug. 2, 2012

(65) Prior Publication Data

US 2013/0033129 A1 Feb. 7, 2013

(30) Foreign Application Priority Data

Aug. 4, 2011 (KR) .................. 10-2011-0077882

(51) Int. Cl.
*H02K 33/00* (2006.01)
*H02K 33/18* (2006.01)
*B06B 1/04* (2006.01)

(52) U.S. Cl.
CPC ............. *H02K 33/18* (2013.01); *B06B 1/045* (2013.01)

(58) Field of Classification Search
CPC .......... H02K 7/063; H02K 33/18; B06B 1/045
USPC ........................... 310/81, 25, 12.16
See application file for complete search history.

(56) References Cited

U.S. PATENT DOCUMENTS

| | | | | |
|---|---|---|---|---|
| 7,525,403 B2 * | 4/2009 | Kim | .............................. | 335/222 |
| 8,253,282 B2 * | 8/2012 | Park | .............................. | 310/25 |
| 2003/0048045 A1 * | 3/2003 | Jupe et al. | ........................ | 310/354 |
| 2006/0022781 A1 * | 2/2006 | Kim | .............................. | 335/296 |
| 2007/0194635 A1 * | 8/2007 | Miura | ............................ | 310/15 |
| 2009/0092699 A1 * | 4/2009 | Hong | ............................. | 425/134 |
| 2010/0327673 A1 * | 12/2010 | Jun et al. | ........................ | 310/25 |

FOREIGN PATENT DOCUMENTS

| | | |
|---|---|---|
| KR | 2003-0036126 | 5/2003 |
| KR | 2007-0075328 | 7/2007 |
| KR | 2010-0021987 | 2/2010 |
| KR | 10-2010-0117896 | 11/2010 |
| KR | 10-1046044 | 7/2011 |

OTHER PUBLICATIONS

Office Action dated Mar. 6, 2013 for related Korean Patent Application No. 10-2011-0077882 and its English summary provided by the clients.
Office Action for related KR App. No. 10-2011-0077882 dated Sep. 17, 2012 and its English summary.
Office Action dated Apr. 16, 2014 for corresponding Chinese Patent Application No. 201110449788.0 and its English summary provided by Applicant's foreign counsel.

* cited by examiner

*Primary Examiner* — Terrance Kenerly
(74) *Attorney, Agent, or Firm* — Ladas & Parry, LLP

(57) ABSTRACT

A linear vibration device may comprise a stator assembly including a plate and a case, and a vibrator assembly including a yoke and a spring. The case of the stator assembly and the spring of the vibrator assembly may be coupled to each other. The case may be provided with a protrusion, the spring may be provided with a groove, and the protrusion and the groove may be coupled to each other.

16 Claims, 3 Drawing Sheets

LINEAR VIBRATION DEVICE HAVING SPRING

CROSS REFERENCE TO RELATED APPLICATION

This application claims the benefit of Korean Patent Application No. 10-2011-0077882, filed on Aug. 4, 2011, entitled "Linear Vibration Device", which is hereby incorporated by reference in its entirety into this application.

BACKGROUND OF THE INVENTION

1. Technical Field

The present invention relates to a linear vibration device.

2. Description of the Related Art

Various types of vibration generation devices have been mounted in portable electronic devices such as a portable phone, a game machine, a portable information terminal, and the like, in order to prevent inconvenience to other people due to an external sound.

In these vibration generation devices, a low cost automation design needs to be performed from a design step in order to implement low cost automation and reduce the number of workers in a manufacturing method.

A process of welding a case (or a bracket) and a spring to each other, which is one of core processes in a manufacturing method, is an obstacle in the LCA design. In the case in which this problem will be solved, it is possible to reduce the number of workers needed to manufacture the vibration generation device. In the case in which the number of workers is reduced, a product may be manufactured at the lowest cost.

The linear vibration device according to the prior art is configured to include a spring member, a weight body, a bracket, and the like, and uses a scheme of welding a spring assembly inwardly of a case in a case assembly and then bonding-assembling a vibrator and a coil raw material thereto. Since this scheme is a scheme of manufacturing a moving assembly by directly assembling a raw material to an assembly, it has a difficulty in implementing low cost automation and reducing the number of workers.

SUMMARY OF THE INVENTION

The present invention has been made in an effort to provide a linear vibration device capable of automating a manufacturing process thereof and reducing the number of workers in the manufacturing process.

According to a preferred embodiment of the present invention, there is provided a linear vibration device including: a stator assembly including a plate and a case; and a vibrator assembly including a yoke and a spring, wherein the case of the stator assembly and the spring of the vibrator assembly are coupled to each other.

The case may be provided with a protrusion, the spring may be provided with a groove, and the protrusion and the groove may be coupled to each other.

After the protrusion of the case and the groove of the spring are coupled to each other, they may be welded to each other.

After the protrusion and the groove are fitted into each other, the spring may rotate, such that a position to be welded is positioned at a central portion of the protrusion.

After the case and the spring are assembled to each other, the welding may be performed from an outer side portion of the case while a position of the spring is confirmed through the groove.

The welding may be laser welding.

DESCRIPTION OF THE PREFERRED EMBODIMENTS

Figure 1:
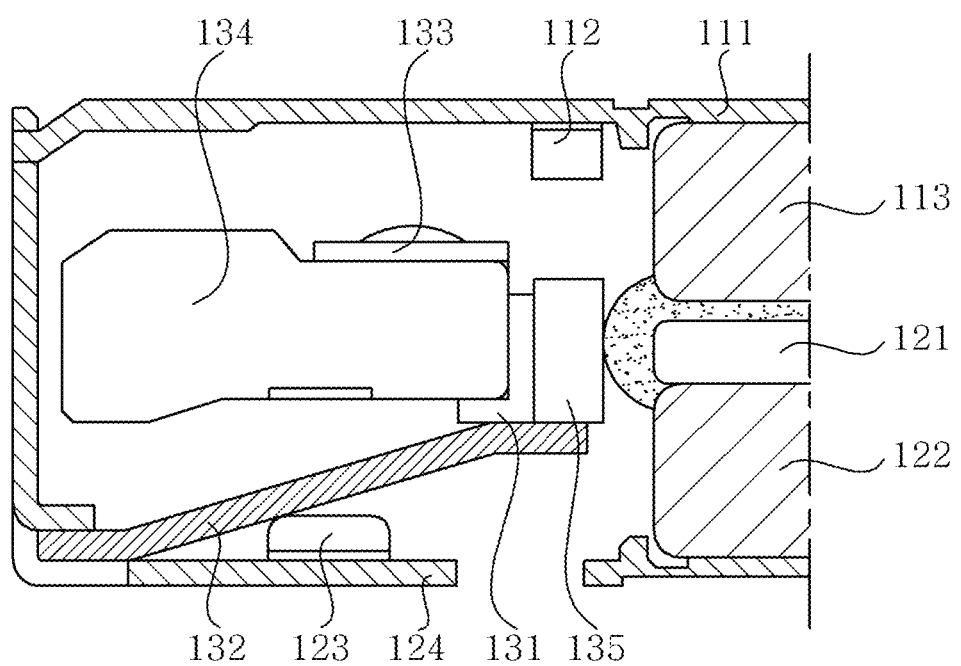
FIG. 1 is a partial cross-sectional view of a linear vibration device according to a preferred embodiment of the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

Figure 2:
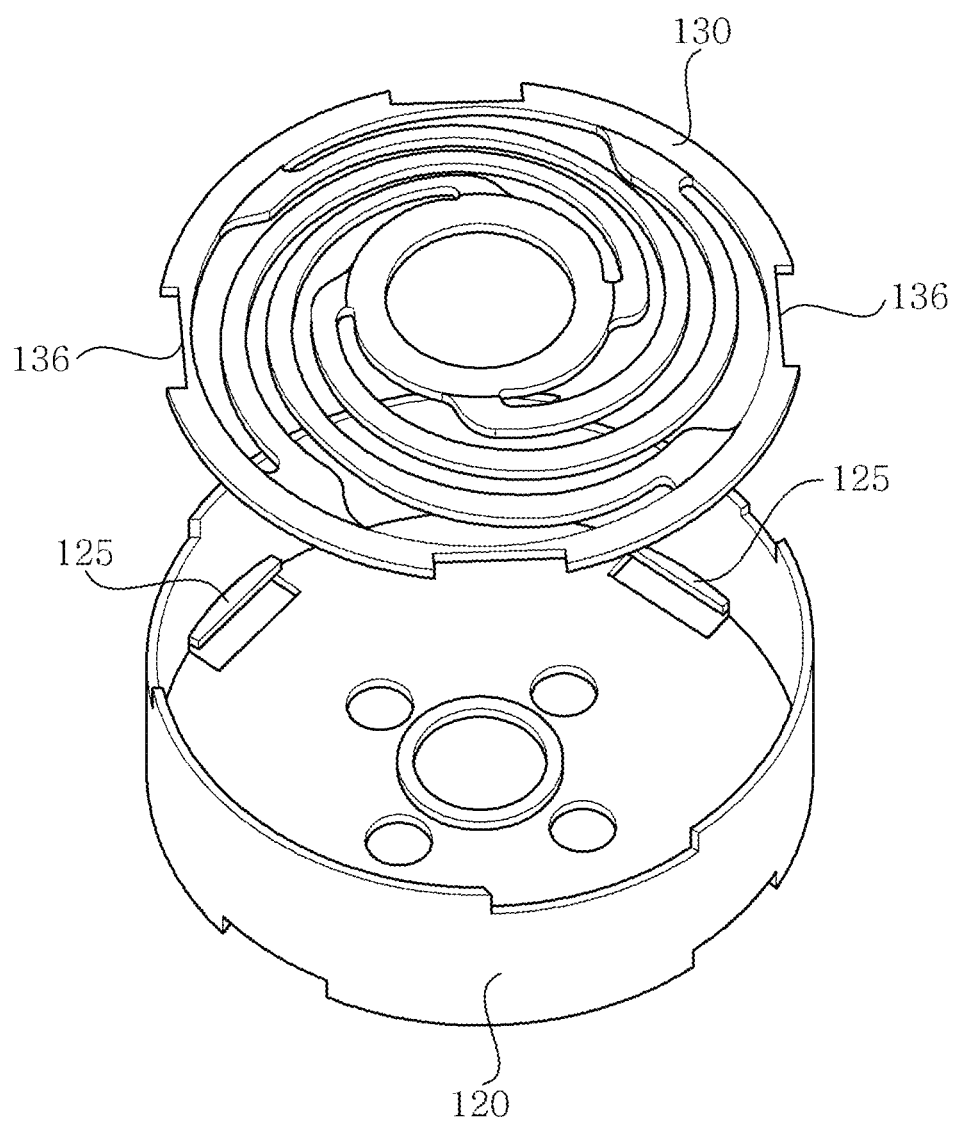
FIG. 2 is an exploded perspective view of a linear vibration device according to a preferred embodiment of the present invention.
Figure 3:
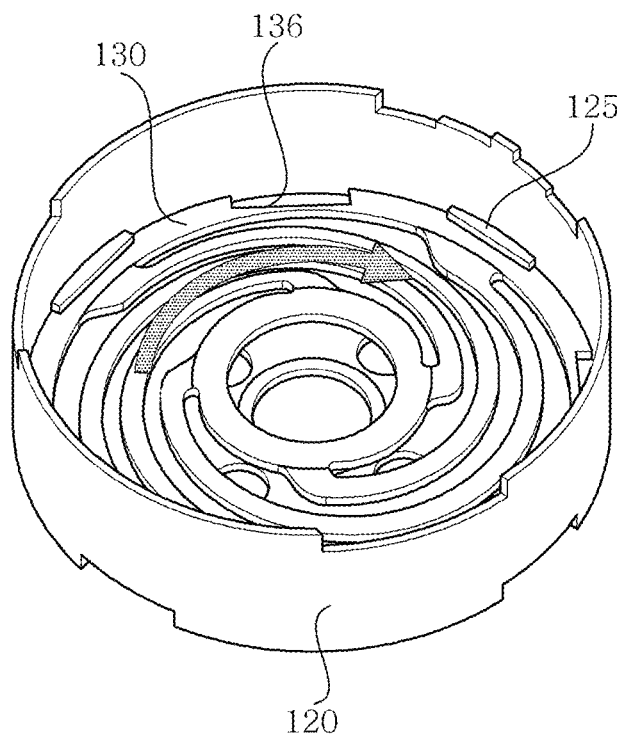
FIG. 3 is an assembly perspective view of a linear vibration device according to a preferred embodiment of the present invention.
Figure 4:
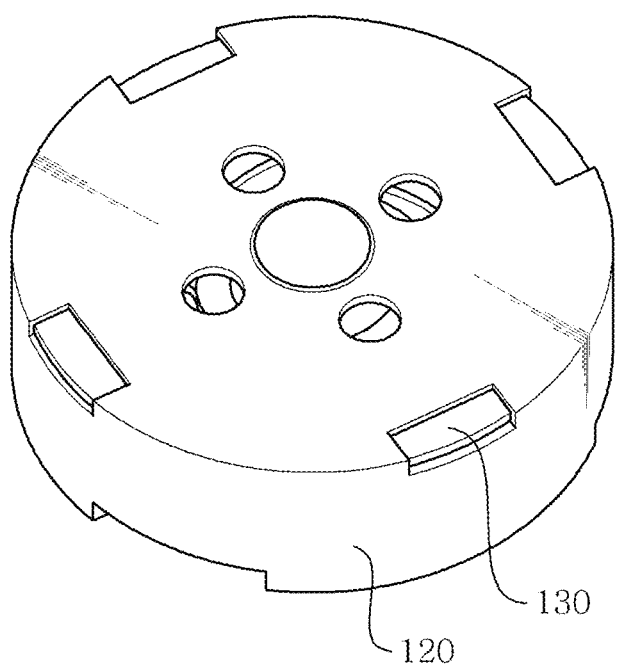
FIG. 4 is an assembly perspective view of a linear vibration device according to a preferred embodiment of the present invention.

FIG. 1 is a partial cross-sectional view of a linear vibration device according to a preferred embodiment of the present invention. FIG. 2 is an exploded perspective view of a linear vibration device according to a preferred embodiment of the present invention. FIG. 3 is an assembly perspective view of a linear vibration device according to a preferred embodiment of the present invention. FIG. 4 is an assembly perspective view of a linear vibration device according to a preferred embodiment of the present invention.

FIG. 1 shows a partial cross-sectional view of a linear vibration device 100. The linear vibration device 100 is configured to include a bracket 111, a first damping Poron 112, a first magnet 113, a plate 121, a second magnet 122, a second damping Poron 123, a case 124, a yoke 131, a spring 132, a flexible printed circuit (FPC) 133, a vibrator 134, and a coil 135.

The bracket 111 serves to enclose and protect the linear vibration device 100 from the outside and is generally made of an iron based material.

The first damping Poron 112 is attached to an upper inner surface of the bracket 111 to thereby prevent friction or abrasion of a vibration part with the bracket 111.

The first magnet 113 is attached to the upper inner surface of the bracket 111 and generates magnetic force.

The plate 121 is formed to be spaced apart from the first magnet 113 by a predetermined interval, and the first magnet 113 and the plate 121 include a magnetic fluid applied therebetween.

The second magnet 122 is attached to a lower portion of the plate 121 and generates magnetic force.

The second damping Poron 123 is attached to a lower surface of the case 124 to thereby prevent friction or abrasion of the case 124 with other components.

The case 124 generally supports the linear vibration device 100 at a lower portion thereof and is connected to the bracket 111 provided at an upper portion thereof to thereby form an inner space of the linear vibration device 100.

The plate 121, the second magnet 122, the second damping Poron 123, and the case 124 configures one assembly, which is called a stator assembly 120. The stator assembly 120 is entirely assembled and then assembled to another assembly.

The yoke 131 is provided between the vibrator 134 and the coil 135, which are a vibration part, to thereby support vibration of a vibration member.

The spring 132 supports the yoke 131 and the coil 135, is provided at the lower portion, and is generally a leaf spring. The spring 132 has a lower distal end fixed to a lower edge of the case 124.

The FPC 133 is provided at an upper portion of the vibrator 134 and includes an electrical circuit and an element mounted thereon to thereby apply an electrical signal.

The vibrator 134 is mounted in the linear vibration device 100 and is connected to the yoke 131 and the coil 135 to thereby vibrate vertically.

The coil 135 is attached to the yoke 131 and is formed to face the first and second magnets 113 and 122, such that the vibration part vibrates by magnetic force generated by the coil 135 and the first and second magnets 113 and 122.

The yoke 131, the spring 132, the FPC 133, the vibrator 134, and the coil 135 configures one assembly, which is called a vibrator assembly 130 The vibrator assembly 130 is assembled to the stator assembly 120.

The stator assembly 120 and the vibrator assembly 130 are formed in order to implement low cost automation and reduce the number of workers in an assembling process. The case 124 of the stator assembly 120 and the spring 132 of the vibrator assembly 130 are simply assembled and coupled to each other, such that the entire linear vibration device 100 may be easily manufactured.

A scheme of directly assembling the stator assembly 120 and the vibrator assembly 130 to each other as described above may further approach the low cost automation without performing a process of placing a raw material on an assembly.

FIG. 2 is a view simply showing a form in which the stator assembly 120 and the vibrator assembly 130 are assembled to each other. When the stator assembly 120 and the vibrator assembly 130 are assembled to each other, a groove 136 of the vibrator assembly 130 is assembled to a protrusion 125 of the stator assembly 120.

FIG. 3, which is a view showing a form after the stator assembly 120 and the vibrator assembly 130 are assembled to each other, shows that after the stator assembly 120 and the vibrator assembly 130 are assembled to each other and the protrusion 125 and the groove 136 are fitted into each other, and the spring rotates, such that a position to be welded is positioned to a central portion of the protrusion. The welding may be laser welding.

FIG. 4, which is a view showing a form after the stator assembly 120 and the vibrator assembly 130 are assembled to each other from an outer side, shows that after the stator assembly 120 and the vibrator assembly 130 are assembled to each other, the stator assembly 120 and the vibrator assembly 130 are welded to each other from an outer side portion of the stator assembly 120 while a position of the vibrator assembly 130 is confirmed through the groove 126.

Since the welding is performed from the outer side portion while the position of the vibrator assembly 130 is confirmed, it is possible to implement the low cost automation and reduce the number of workers in a process of assembling the stator assembly 120 and the vibrator assembly 130 to each other.

Therefore, a manufacturing time may be reduced, and labor costs may be reduced.

As set forth above, with the linear vibration device according to the preferred embodiment of the present invention, after the stator assembly and the vibrator assembly are assembled to each other, the stator assembly and the vibrator assembly are welded to each other from the outer side portion of the stator assembly while the position of the vibrator assembly is confirmed through the groove.

Although the preferred embodiments of the present invention have been disclosed for illustrative purposes, they are for specifically explaining the present invention and thus a linear vibration device according to the present invention are not limited thereto, but those skilled in the art will appreciate that various modifications, additions and substitutions are possible, without departing from the scope and spirit of the invention as disclosed in the accompanying claims.

Accordingly, such modifications, additions and substitutions should also be understood to fall within the scope of the present invention.

What is claimed is:

1. A linear vibration device comprising:
a stator assembly including a plate and a case; and
a vibrator assembly including a yoke and a spring,
wherein the case of the stator assembly and the spring of the vibrator assembly are coupled to each other,
wherein the case is provided with a protrusion extended and formed to a side of the case, the spring is provided with a groove, and the protrusion and the groove are coupled to each other,
wherein the protrusion is formed to be spaced apart from a bottom side of the case with a predetermined height, the protrusion and the groove are fitted into each other, the spring is rotatable, and the spring is assembled to be located between the protrusion and the bottom side of the case, and
wherein the groove is formed on the edge of the spring, a portion which the groove is not formed among the edges of the spring is assembled to be located between the protrusion and the bottom side of the case, the portion where the groove is not formed among the edges of the spring is welded to the case.

2. The linear vibration device as set forth in claim 1, wherein after the protrusion and the groove are fitted into each other, the spring rotates, such that a position to be welded is positioned at a central portion of the protrusion.

3. The linear vibration device as set forth in claim 1, wherein after the case and the spring are assembled to each other, the welding is performed from an outer side portion of the case while a position of the spring is confirmed through the groove.

4. The linear vibration device as set forth in claim 1, wherein the welding is laser welding.

5. The linear vibration device as set forth in claim 1, wherein the protrusion of the case and the groove of the spring are coupled to each other, welded to each other, wherein after the case and the spring are assembled to each other, the welding is performed from an outer side portion of the case while a position of the spring is confirmed through the groove formed on the case.

6. The linear vibration device as set forth in claim 5, wherein the spring is formed of a leaf spring.

7. The linear vibration device as set forth in claim 1, further comprising a bracket is connected to the case provided at a portion thereof to thereby form an inner space.

8. The linear vibration device as set forth in claim 7, further comprising a first damping Poron is attached to an inner surface of the bracket to thereby prevent friction or abrasion of a vibration part with the bracket when a vibrator assembly vibrates.

9. The linear vibration device as set forth in claim 8, further comprising a second damping Poron is attached to a lower surface of the case to thereby prevent friction or abrasion of the case with other components.

10. The linear vibration device as set forth in claim 7, further comprising a first magnet is attached to the inner surface of the bracket and generates magnetic force.

11. The linear vibration device as set forth in claim 10, further comprising a plate is formed to be spaced apart from the first magnet by a predetermined interval.

12. The linear vibration device as set forth in claim 11, further comprising a magnetic fluid applied between the first magnet and the plate.

13. The linear vibration device as set forth in claim 12, further comprising a second magnet is attached to the plate and generates magnetic force.

14. The linear vibration device as set forth in claim 13, further comprising a coil is attached to the yoke and is formed to face the first and second magnets.

15. The linear vibration device as set forth in claim 14, further comprising a vibrator is connected to the yoke and the coil to thereby vibrate vertically.

16. The linear vibration device as set forth in claim 15, further comprising a flexible printed circuit (FPC) is provided at the vibrator and includes an electrical circuit and an element mounted thereon to thereby apply an electrical signal.

* * * * *